United States Patent [19]

Lee

[11] Patent Number: 5,060,983

[45] Date of Patent: Oct. 29, 1991

[54] CLAMPLESS HOSE CONNECTION

[75] Inventor: Carlos Lee, Chatham, Canada

[73] Assignee: Siemens Automotive Limited, Chatham, Canada

[21] Appl. No.: 577,953

[22] Filed: Sep. 5, 1990

[51] Int. Cl.[5] .............................................. F16L 35/00
[52] U.S. Cl. ..................................... 285/39; 285/423; 285/903; 285/921
[58] Field of Search ............... 285/423, 921, 903, 260, 285/39

[56] References Cited

U.S. PATENT DOCUMENTS

| 2,985,469 | 5/1961 | Bowman, Jr. | 285/260 |
| 3,262,721 | 7/1926 | Knight | 285/174 |
| 3,603,621 | 9/1971 | Parsons | 285/319 |
| 3,948,547 | 4/1976 | Gache | 285/317 |
| 4,003,591 | 1/1977 | Schuldink | 285/423 X |
| 4,099,744 | 7/1978 | Kutnyak et al. | 285/7 |
| 4,317,471 | 3/1982 | King | 137/798 |
| 4,361,349 | 11/1982 | Wolf et al. | 285/423 X |
| 4,521,038 | 6/1985 | Cerny | 285/903 X |
| 4,597,594 | 7/1986 | Kacalieff et al. | 285/423 |

FOREIGN PATENT DOCUMENTS 2091365  7/1982  United Kingdom ................ 285/260

Primary Examiner—Dave W. Arola
Assistant Examiner—Heather Chun
Attorney, Agent, or Firm—George L. Boller; Russel C. Wells

[57] ABSTRACT

A relatively resilient hose end telescoped over a relatively rigid tube end wherein a first axial zone of the tube end has an exterior rib with a circumferentially continuous radially outermost edge and a second axial zone of the tube end proximal to the first axial zone has circumferentially extending beveled exterior retention ribs, the hose end has a third axial zone which contains circumferentially extending beveled interior retention ribs complementary to those of the second axial zone, the exterior retention ribs and the interior retention ribs coact to resist axial separation of the hose end from the tube end with greater resistance than that encountered during telescoping of the hose end over the tube end, the hose end has a fourth axial zone proximal to the third axial zone and a fifth axial zone proximal to the fourth axial zone, the fourth axial zone has a nominal wall thickness less than those of the immediately contiguous portions of the third and fifth axial zones, and the fourth axial zone is stretched over the exterior rib of the first zone such that an axially intermediate portion of the fourth zone has circumferentially continuous sealing contact with the radially outermost edge of the first axial zone's exterior rib and axial portions of the fourth axial zone that axially bound the axially intermediate portion of the fourth axial zone extend radially inwardly away therefrom.

4 Claims, 1 Drawing Sheet

CLAMPLESS HOSE CONNECTION

FIELD OF THE INVENTION

This invention relates to a connection for telescopically connecting an end of a relatively flexible tubular part, such as a rubber hose, to an end of a relatively rigid tubular part, such as a plastic tube or fitting, particularly a connection that does not require the use of a separate mechanical clamp.

BACKGROUND AND SUMMARY OF THE INVENTION

When a hose is connected to a tubular member to form all or a portion of a passage through which fluid is to be conveyed, it is usually an essential requirement that the connection be not only secure enough to prevent accidental separation of one part from the other, but also sufficiently leak-proof that neither will the fluid being conveyed leak out of the passage to the surrounding environment nor will fluid from the surrounding environment leak into the passage. Since the hose is typically relatively flexible, and the tubular member, relatively rigid, the connection comprises one end of the hose telescoped over the outside of one end of the tubular member and held thereon by means of a separate mechanical clamp, usually in the form of a band that has been circumferentially contracted around the telescopically engaged ends of the hose and fitting. A connection that can be both secure and leak-proof without the use of a separate mechanical clamp would be desirable since the clamp could then be eliminated. The present invention relates to such a clampless connection.

A connection according to principles of the invention is particularly useful for applications where the external pressure exceeds the internal. An exemplary use of a connection embodying the present invention is in the air induction system of an automobile internal combustion engine. With the engine running, the pressure within the air induction system is sub-atmospheric, i.e. a partial vacuum. A leaky connection will result in the intrusion of air through the connection and into the engine, often causing undesired consequences such improper induction air temperature, noise, or de-tuning of a tuned induction system.

In addition to being secure, leak-proof, and clampless, a connection embodying principles of the present invention provides for the convenient push-on assembly of the relatively flexible part over the relatively rigid part. Further features, advantages and benefits of the invention will be seen in the ensuing description and claims which are to be considered in conjunction with the accompanying drawings. These drawings illustrate a presently preferred embodiment of the invention according to the best mode contemplated at the present time for carrying out the invention.

DESCRIPTION OF THE PREFERRED EMBODIMENT

Figure 1:
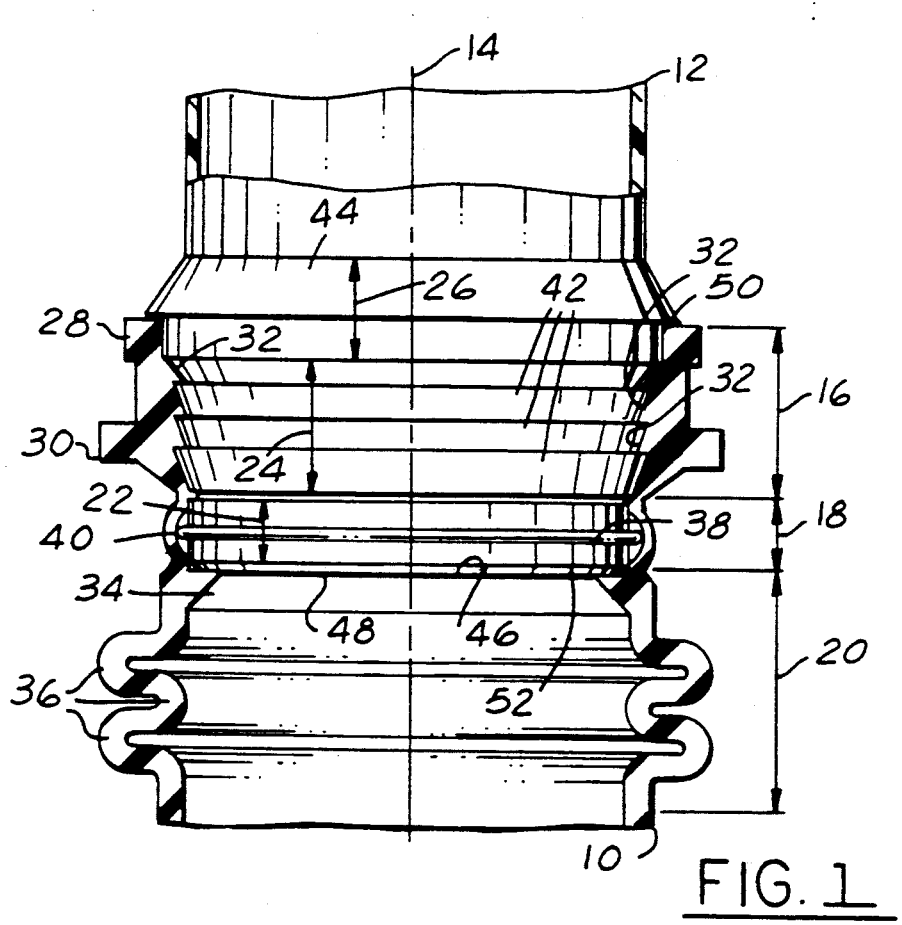
FIG. 1 is a longitudinal cross section through a first embodiment of clampless connection according to the present invention.

FIG. 1 shows one end of a tubular hose 10 having a clampless connection to one end of a tubular part 12. Hose 10 is fabricated, using conventional hose fabrication technology, from a material that possesses a certain resilient flexibility, such as any of a number of well known elastomers, while part 12 is fabricated from a material that is relatively rigid in comparison to hose 10. For example, part 12 can be any of a number of well known plastics, and it can be fabricated through the use of conventional plastic-forming technology. Each part 10, 12 has a longitudinal axis, and the drawing shows the parts coaxially connected together about a co-axis 14. Each part is in essence a body of revolution about its own axis so that any transverse cross section through it will have a circular shape.

The part ends shown in the drawing comprise several axial zones. Hose 10 comprises: a distalmost retention zone 16; a sealing zone 18 proxially contiguous with zone 16; and a shock-absorbing zone 20 proximally contiguous with zone 18. Part 12 comprises a distalmost sealing zone 22; a retention zone 24 proximally contiguous with zone 22; and a zone 26 proximally contiguous with zone 24.

Zone 16 of hose 10 comprises a circumferentially continuous external rib 28 at its distalmost end and a circumferentially continuous external rib 30 spaced proximally of rib 28, the latter having a slightly greater O.D. than the former. Both ribs 28 and 30 are rectangular-shaped in radial cross section. On its interior, zone 16 has several circumferentially continuous, axially adjacent beveled ribs 32 which in radial cross section are triangular-shaped.

Zone 18 has a nominal wall thickness less than the nominal wall thicknesses of zones 16 and 20 so as to be relatively more resiliently stretchable than the latter two zones, particularly in the circumferential sense. In general the mean diameter of zone 18 is approximately the same as that of ribs 32.

Zone 20 has a circumferentially continuous internal rib 34 substantially immediately proximate zone 18 and triangular-shaped in radial cross section. It also has several convolutions 36 spaced proximally of rib 34.

At essentially its axial midpoint, zone 22 comprises a circumferentially continuous external rib 38 shaped to have a circumferentially continuous radially outermost edge 40 that is fairly sharp, i.e. has a relatively small radius of curvature.

On its exterior, zone 24 has several circumferentially continuous, axially adjacent beveled ribs 42 which are complementary to ribs 32 and in radial cross section are triangular-shaped.

Zone 26 comprises a circumferentially continous external rib 44 spaced axially from the nearest rib 42.

In the connected condition of the two parts 10, 12 as shown in FIG. 1: ribs 32 and 42 coact to resist axial separation of the two parts 10, 12; zone 18 is stretched over rib 38 so that it makes circumferentially continuous sealing contact with edge 40; and an axially facing shoulder 46 of rib 34 is abutting the distal end surface 48 of part 12. Convolutions 36 form a bellows which functions as a shock absorber to certain axial pulling forces exerted on the hose proximally thereof and also allows the more proximal portion of the hose to be flexed out of coaxiality with its connection to part 12.

In the unconnected condition (not shown) of parts 10 and 12, zone 18 is relaxed from its circumferentially stretched condition portrayed in FIG. 1.

The connection of the two parts is made by axially aligning their distal ends in mutual juxtaposition and then relatively axially advancing one toward the other such that the end of hose 10 telescopes over the end of tubular part 12. Each part has a chamfer 50, 52, respectively, at its distal end to aid in the assembly process.

In addition to increasing the hoop strength of zone 16, rib 30 provides a tool-engagement surface with which a suitable assembly tool (not illustrated) can be abutted to aid in pushing hose 10 onto part 12.

The beveling of ribs 32 and 42 is such that their resistance to relative advancement of the two parts 10 and 12 during the act of connecting the two parts is much less than their resistance to disconnection of the two parts after they have been connected. In this way the mutually engaged ribs provide sufficiently secure retention. The mutual abutment of surfaces 46 and 48 creates a positive stop which sets the extent to which hose 10 can be axially telescoped onto part 12 and thus forms an axial locator for obtaining the proper degree of telescoping so that the various zones of the respective parts coact in the intended manner to achieve the desired features of the connection. If desired, rib 28 could also coact with rib 44 to create a positive stop locator as well. It should be understood that the particular number of beveled ribs that has been illustrated is exemplary and that the same holds true in the case of rib 38 and zone 18.

While the mutually engaged ribs 32, 42 obviously provide some degree of sealing, it is zones 18 and 20 that create the sufficiently leak-proof seal without the necessity of a separate mechanical clamp girdling the telescopically engaged ends of the connected parts. The drawing shows that zone 18 is stretched over said rib 38 such that an axially intermediate portion of zone 18 has circumferentially continuous sealing contact with the radially outermost edge 40 of rib 38 and axial portions of zone 18 that axially bound such axially intermediate portion of zone 18 fall radially inwardly away therefrom. While relative sharpness for edge 40 is desirable, the edge should not be sharp enough to cut through the wall of zone 18 over the expected life of the parts in the particular use involved.

Principles of the invention may be used to advantage in the air induction system of an automobile engine. The two parts can be quickly connected to form a leak-proof joint. Because the internal pressure should typically not exceed the ambient pressure acting on the exterior of the joint, any such corresponding pressure differential between the two should further enhance the sealing of zone 20 to rib 38.

Figure 2:
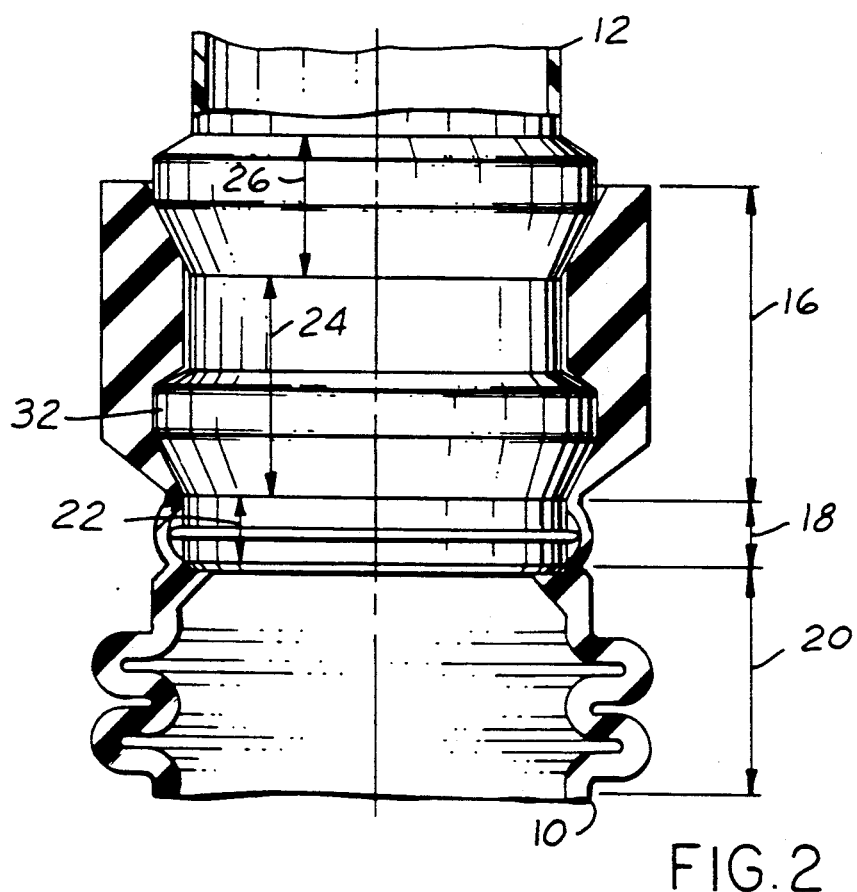
FIG. 2 is a longitudinal cross section through a second embodiment of clampless connection according to the present invention.

FIG. 2 illustrates an embodiment that is like the FIG. 1 embodiment except insofar as details of zones 16, 24, and 26 are concerned. Corresponding details in both FIGS. are designated by corresponding reference numerals. The principal distinction between the two embodiments is that in FIG. 2 zone 16 has only a single beveled rib 32 instead of the several beveled ribs 32 in FIG. 1, and the shapes of the respective ribs of the affected zones are different.

While a preferred embodiment of the invention has been illustrated and described, principles of the invention may be embodied in other equivalent ways.

What is claimed is:

1. A clampless connection of a relatively resilient hose end telescoped over a relatively rigid tube end comprising:

said tube end comprising a first axial zone which contains a circumferentially continuous exterior rib having a circumferentially continuous radially outermost edge and a second axial zone which is proximal to said first axial zone and contains at least one circumferentially extending beveled exterior retention rib;

said hose end comprising a third axial zone which contains at least one circumferentially extending beveled interior retention rib complementary to said at least one circumferentially extending beveled exterior retention rib of said second axial zone;

said at least one circumferentially extending beveled exterior retention rib and said at least one circumferentially extending beveled interior retention rib coacting to resist axial separation of said hose end from said tube end with a much greater degree of resistance than that encountered during telescoping of the hose end over the tube end;

said hose end comprising a fourth axial zone that is proximal to said third axial zone and a fifth axial zone that is proximal to said fourth axial zone, said fourth axial zone having a nominal wall thickness that is less than the nominal wall thicknesses of the immediately contiguous portions of said third and fifth axial zones;

and wherein said fourth axial zone is stretched over said first axial zone's exterior rib wherein said hose end is telescoped over said tube end such that an axially intermediate portion of said fourth zone has circumferentially continuous sealing contact with said radially outermost edge of said first axial zone's exterior rib and axial portions of said fourth axial zone that axially bound said axially intermediate portion of said fourth axial zone extend radially inwardly on each side of said first axial zone's exterior rib.

2. A clampless connection as set forth in claim 1 including a positive stop locator means to limit the extent to which said hose end can be telescoped over said tube end and thereby properly axially locate the axial zones of said hose end to the axial zones of said tube end.

3. A clampless connection as set forth in claim 1 including a flange on the exterior of said third axial zone providing both hoop strength to said third axial zone and also an abutment surface for a tool used to push the hose end onto the tube end during the act of telescoping the hose end over the tube end.

4. A clampless hose connection as set forth in claim 1 wherein said fifth axial zone includes a bellows that is spaced proximally of the portion of said fifth axial zone immediately contiguous said fourth axial zone and that provides for that portion of the hose end which is proximal thereto to be flexed out of axial alignment with the connection.

* * * * *